United States Patent [19]

Pierce et al.

[11] Patent Number: 5,584,017
[45] Date of Patent: Dec. 10, 1996

[54] CACHE CONTROL WHICH INHIBITS SNOOP CYCLES IF PROCESSOR ACCESSING MEMORY IS THE ONLY PROCESSOR ALLOWED TO CACHE THE MEMORY LOCATION

[75] Inventors: Paul R. Pierce; Anthony M. Zilka, both of Portland, Oreg.

[73] Assignee: Intel Corporation, Santa Clara, Calif.

[21] Appl. No.: 425,351

[22] Filed: Apr. 18, 1995

Related U.S. Application Data

[63] Continuation of Ser. No. 812,126, Dec. 19, 1991, abandoned.

[51] Int. Cl.[6] .......................... G06F 12/00; G06F 13/00
[52] U.S. Cl. .............. 395/473; 364/243.41; 364/243.44; 364/246.3; 364/DIG. 1; 395/479; 395/480; 395/466
[58] Field of Search ............................ 395/479, 480, 395/468, 465, 466, 472, 473; 364/243.4, 243.41, 243.44, 246.3

[56] References Cited

U.S. PATENT DOCUMENTS

| | | | |
|---|---|---|---|
| 4,394,731 | 7/1983 | Flusche et al. | 395/472 |
| 4,785,398 | 11/1988 | Joyce et al. | 395/403 |
| 4,827,406 | 5/1989 | Bischoff et al. | 395/480 |
| 4,876,643 | 10/1989 | McNeill et al. | 395/290 |
| 4,885,680 | 12/1989 | Anthony et al. | 395/471 |
| 4,939,641 | 7/1990 | Schwartz et al. | 395/473 |
| 4,959,777 | 9/1990 | Holman, Jr. | 395/468 |
| 5,010,475 | 4/1991 | Hazawa | 395/403 |
| 5,148,533 | 9/1992 | Joyce et al. | 395/471 |
| 5,157,774 | 10/1992 | Culley | 395/466 |
| 5,210,844 | 5/1993 | Shimura et al. | 395/480 |
| 5,226,144 | 7/1993 | Moriwaki et al. | 395/448 |
| 5,247,673 | 9/1993 | Costa et al. | 395/650 |
| 5,265,232 | 11/1993 | Gannon et al. | 395/451 |
| 5,297,270 | 4/1994 | Olson | 395/403 |
| 5,313,609 | 5/1994 | Baylor et al. | 395/448 |
| 5,404,489 | 4/1995 | Woods et al. | 395/479 |

*Primary Examiner*—Thomas G. Black
*Assistant Examiner*—Jack M. Choules
*Attorney, Agent, or Firm*—Blakely, Sokoloff, Taylor & Zafman

[57] ABSTRACT

A multi-processor cache control system wherein cache control information is encoded into the address bits of a memory access request. The encoded cache control information is used to optimize cache control functions. Each memory access request is comprised of at least two elements. First, an address field is provided to define the location of the desired data item. Secondly, cache control information is provided in a cache control field within each memory access request. The cache control field comprises a plurality of bits that define a relationship between the address field and a plurality of local caches associated with processors in a multi-processor system. This relationship determines which of a plurality of local caches may cache the data item referenced by the address within the address field.

14 Claims, 6 Drawing Sheets

CACHE CONTROL WHICH INHIBITS SNOOP CYCLES IF PROCESSOR ACCESSING MEMORY IS THE ONLY PROCESSOR ALLOWED TO CACHE THE MEMORY LOCATION

This is a continuation of application Ser. No. 07/812,126 filed Dec. 19, 1991, and now abandoned.

BACKGROUND OF THE INVENTION

1. Field Of The Invention

The present invention relates to the field of multi-processor computer systems. Specifically, the present invention relates to multi-processor computer systems using a local cache.

2. Prior Art

Conventional multi-processor computer systems comprise a plurality of processors all sharing a common memory. These processors can be coupled with the shared memory in a variety of architectural structures. In general, each processor may access the shared memory for the purpose of writing information into the shared memory or reading information therefrom. Because access to a shared memory may be a relatively slow operation, conventional multi-processor systems typically employ the use of a local cache for each processor of the multi-processor system. Thus, each multi-processor has a separate local cache associated with the processor. Each local cache is a small high speed memory for the temporary storage of information that has been transferred between the processor and shared memory. The use of a local cache is intended to reduce the number of accesses between a processor and shared memory. For each access to shared memory, a block of shared memory may be retrieved and stored in the local cache associated with a processor. The processor may then manipulate the data stored in the local cache at a higher rate of speed than possible with repeated access to shared memory.

Although the use of a local cache increases processor throughput, additional control functions for maintaining the local cache are necessary. For example, one such control function is maintaining cache consistency across a multi-processor system. Because a copy of a portion of shared memory may be maintained within the local cache for any or all processors of the multi-processor system, the contents of each local cache must be made and kept consistent with the corresponding memory locations within shared memory. For example, if one processor modifies a location in its local cache, the corresponding location in shared memory as well as the corresponding location in other local caches must be updated accordingly. Thus, if two or more processors have copies of the same data item in their local cache, there must be a means of ensuring that any modifications to one copy of the data item are duplicated into the other processors having copies of that data item in their local cache.

The conventional method for ensuring consistency between the local caches of processors in a multi-processor system is called snooping. Snooping is a cache control operation performed in conventional multi-processor computer systems. For each reference to a local cache location that may be duplicated in the local cache of another processor, the snooping operation is used to: 1) determine which other local caches contain copies of the referenced item; and 2) to make the location of the referenced item consistent throughout all local caches of the system. Snooping is a required task in any multi-processor computer system having multiple caches. In most conventional multi-processor computer systems, the snooping operation is performed on every memory reference that may be a reference to a location in a local cache.

Although snooping is required for cache consistency, the snooping operation is a relatively slow operation. In fact, snooping often takes more time than a memory reference itself. Snooping consumes a relatively large percentage of a processor's computational bandwidth. For this reason, it is advantageous to minimize the number of times that the snooping operation is performed. Prior art systems, however, cannot minimize the frequency of the snooping operation without risking cache inconsistency problems.

Thus, a better means and method is needed for optimizing the operation of cache control functions.

SUMMARY OF THE INVENTION

The present invention is a multi-processor cache control system employing address bits for encoding cache information. Using this cache control information, cache control functions may be optimized.

In the preferred embodiment, each processor in a multi-processor system includes a local cache. Each local cache is used by its respective processor for the temporary storage of information retrieved from a common memory. It is possible for one local cache to contain a copy of a data item which is also located in the local cache of a different processor. It is critical that any modification performed on a data item that may be resident in the local cache of a different processor must be performed on the corresponding data item in each local cache in which the copy of the data item is resident. This operation of maintaining cache consistency between the local caches contained within each processor in a multi-processor system is called snooping. Snoop control logic is used to maintain cache consistency in each of the local caches associated with processors in a multi-processor system. It will be apparent to those skilled in the art that the snooping operation consumes a relatively large portion of the available processing time provided by each processor.

The present invention provides a means for associating each memory reference with a set of specific processors that may cache that memory reference. Thus, a means is provided for determining when snooping is needed and which local caches need to be snooped. The present invention, therefore, optimizes the snooping operation and thus significantly improves the performance of a multi-processor system.

The present invention uses address bits of a memory reference for the purpose of encoding cache information associated with the memory reference. The combination of the memory reference address and the cache information results in a memory access request that may be used to optimize the snooping operation.

Each memory access request is comprised of at least two elements. First, an address field is provided to define the location of the desired data item. Secondly, cache control information is provided in a cache control field within each memory access request. The cache control field comprises a plurality of bits that define a relationship between the address field and a plurality of local caches associated with processors in a multi-processor system. This relationship determines which of a plurality of local caches may cache the data item referenced by the address within the address field.

It is, therefore, an object of the present invention to provide a multi-processor cache control system for optimizing the operation of cache control functions. It is a further object of the present invention to provide a multi-processor cache control system wherein address bits of a memory access request are used to encode cache control information. It is a further object of the present invention to provide a multi-processor cache control system wherein caching of particular data items may be limited to specific processors. It is a further object of the present invention to provide a multi-processor cache control system wherein hardware may be used to determine when snooping is necessary and which local caches need to be snooped. It is a further object of the present invention to provide a multi-processor cache control system wherein the frequency of snooping can be reduced or eliminated resulting in better computer system performance. It is a further object of the present invention to provide a multi-processor cache control system wherein various blocks of memory may be associated with different cache control information which forms a correspondence between the memory block and processors needing to reference it.

These and other objects of the present invention will become apparent as presented and described in the following description of the preferred embodiment.

DETAILED DESCRIPTION OF THE PREFERRED EMBODIMENT

The present invention is a multi-processor cache control system wherein cache control information is encoded into the address bits of a memory access request. The encoded cache control information is used to optimize cache control functions. In the following description, numerous specific details are set forth in order to provide a thorough understanding of the present invention. However, it will be apparent to one of ordinary skill in the art that these specific details need not be used to practice the present invention. In other circumstances, well known structures, circuits, and interfaces have not been shown in detail in order not to unnecessarily obscure the present invention.

Figure 1:
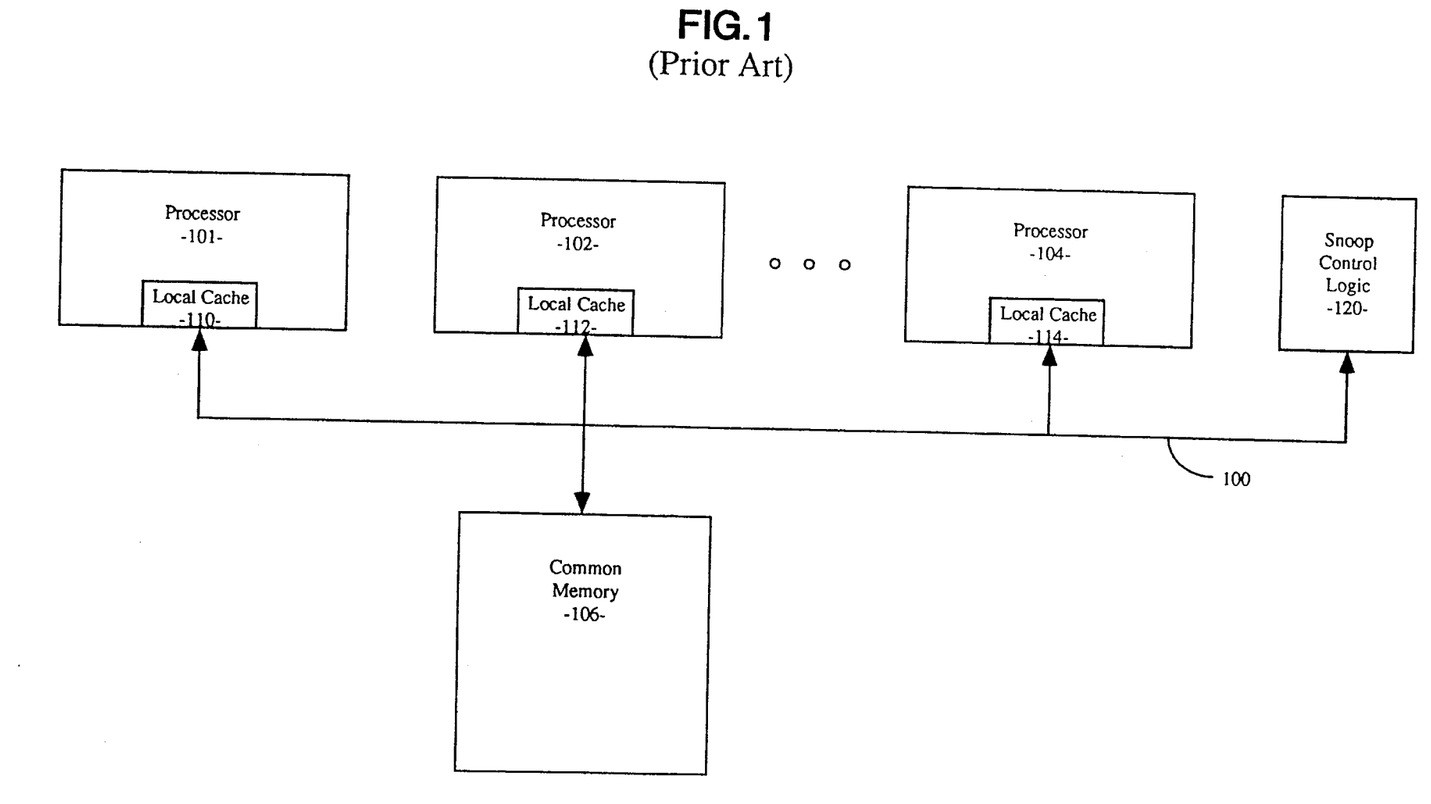
FIG. 1 is a block diagram of the architecture of a typical multi-processor computer system employing a local cache for each processor.

Referring now to FIG. 1, a block diagram of a typical architecture of a multi-processor computer system employing a local cache for each processor is illustrated. In general, such multi-processor computer systems comprise a bus 100 or other data communications medium for communicating information, processors 101, 102 and 104 coupled with the bus 100 for processing information, and a shared or common memory 106 coupled with the bus 100 for storing information and instructions for each of the processors 101, 102 and 104. Common memory 106 is typically a dynamic random access memory (DRAM). It will be apparent to those skilled in the art that any number of processors may be coupled to bus 100 and able to share information with other processors and with common memory 106. It will also be apparent to those skilled in the art that the devices coupled to bus 100 herein referred to as processors may include central processing units (CPUs), direct memory access (DMA) controllers, or other devices that initiate or control accesses to common memory 106.

The present invention is embodied in a GP node to be used in the Touchstone SIGMA computer and a follow on massively parallel super computer. The GP node is a two-processor shared memory design using i860 XP processors manufactured by the assignee of the present invention.

Each processor in the multi-processor system illustrated in FIG. 1 includes a local cache. For example, processor 101 includes local cache 110. Similarly, processor 102 includes local cache 112 and processor 104 includes local cache 114. Each local cache is used by its respective processor for the temporary storage of information retrieved from common memory 106. Each local cache is a high speed memory resource with which the associated processor may communicate at a faster rate of speed than a processor may communicate directly with common memory 106.

In a typical mode of operation, a processor such as processor 101 accesses common memory 106 and retrieves a block of memory which is then transferred to local cache 110. Processor 101 may then process and manipulate the copy of common memory 106 maintained in local cache 110 at a high rate of speed. If any modifications are made to locations within local cache 110, cache control logic must transfer these modifications to common memory 106 in order to maintain cache consistency. Concurrently with the operation of processor 101 and local cache 110, processor 102 may maintain a copy of a portion of common memory 106 within local cache 112. The copy of a portion of common memory 106 maintained within local cache 112 may comprise: 1) exactly the same block of memory maintained within local cache 110; 2) a completely distinct portion of common memory 106; or 3) part of the copy of memory located within local cache 110 and a copy of memory not located within local cache 110. Thus, the local cache 110, 112, and 114 for each of the respective processors of the multi-processor system illustrated in FIG. 1 may contain a copy of any arbitrary portion of common memory 106.

It is possible for one local cache to contain a copy of a data item which is also located in the local cache of a different processor. It is critical that any modification performed on a data item that may be resident in the local cache of a different processor must be performed on the corresponding data item in each local cache in which the copy of the data item is resident. This operation of maintaining cache consistency between the local caches contained within each processor in a multi-processor system is called snooping. The snooping operation is performed by snoop control logic 120 (generally termed cache consistency logic) coupled with bus 100 as illustrated in FIG. 1.

Snoop control logic 120 is used to maintain cache consistency in each of the local caches associated with processors in a multi-processor system. When any processor references its local cache, snoop control logic 120 is activated if references are made to a memory location that may have been duplicated into the local cache of other processors.

Snoop control logic 120 is responsible for maintaining consistency among the duplicate copies of memory locations maintained in a plurality of local caches.

Figure 2:
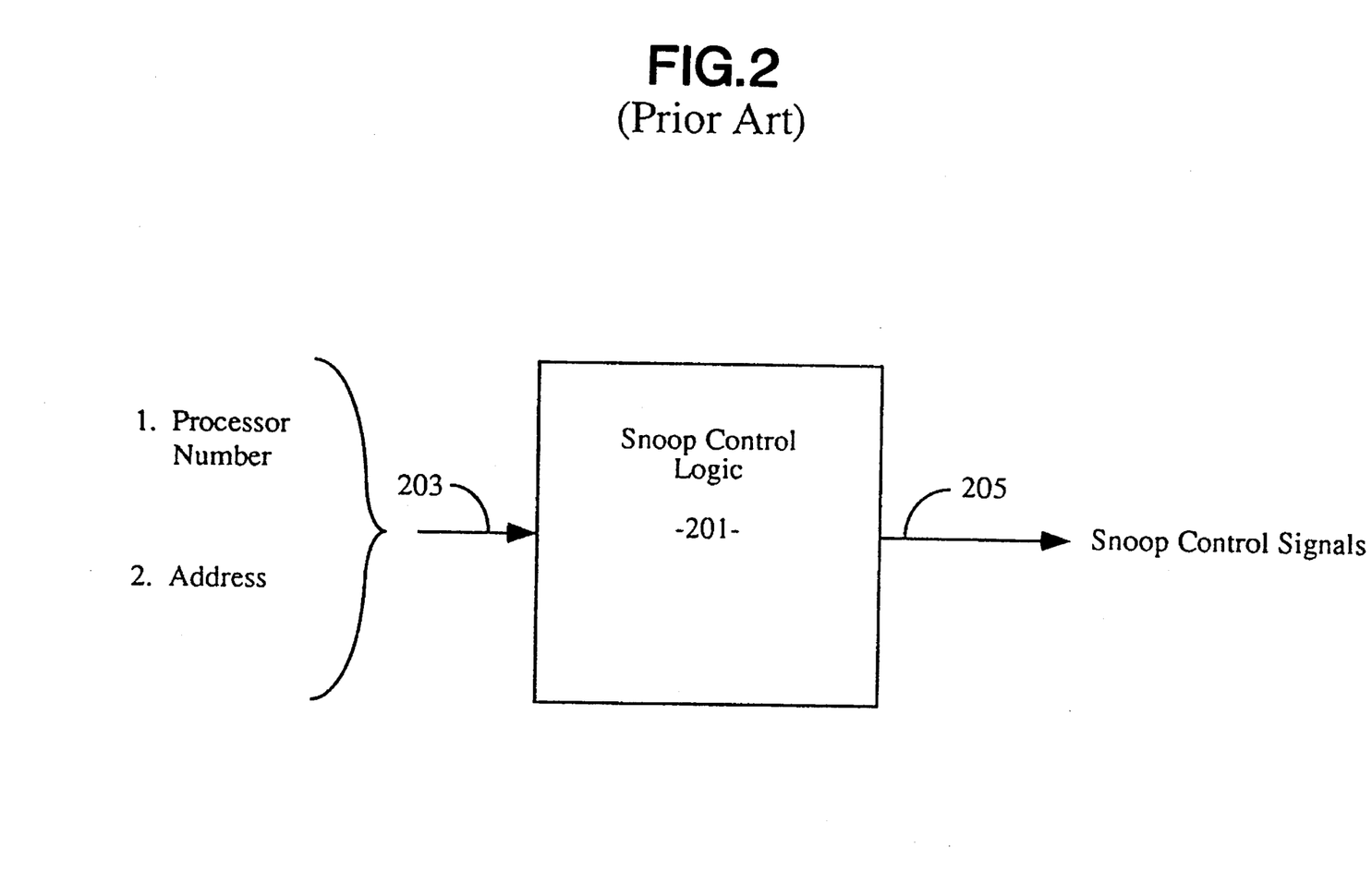
FIG. 2 illustrates a prior art interface for a snoop control logic block.

Referring now to FIG. 2, the information received by the prior art snoop control logic 201 is illustrated. For each cacheable memory reference, snoop control logic 201 receives: 1) a processor number or processor identifier; and 2) an address of the memory reference. The processor number identifies the processor making the memory reference. The memory address identifies the memory location referenced by the processor. Upon receiving these two input data items on line 203, snoop control logic 201 must determine if processors other than the processor identified by the processor number have an active local cache in which the memory location identified by the input address is resident (i.e. a duplicate copy of the memory location). If a duplicate copy is found, snoop control signals are generated on line 205 to logic (not shown) that writes the contents of a memory location within one local cache to the corresponding memory location of other local caches. In this way, consistency is maintained in the local caches of each processor in a multi-processor system. Other logic is used to maintain consistency between each of the local caches and common memory 106.

It will be apparent to those skilled in the art that the snooping operation consumes a relatively large portion of the available processing time provided by each processor. Snooping is thus a relatively expensive operation. For multi-processor systems having a large number of processors and thus a large number of local caches, the time required to perform the snooping operation is exacerbated. Moreover, most conventional multi-processor systems snoop on every memory reference that is a potentially cached memory reference. Thus, many processing cycles are required to support the snooping function.

Figure 3:
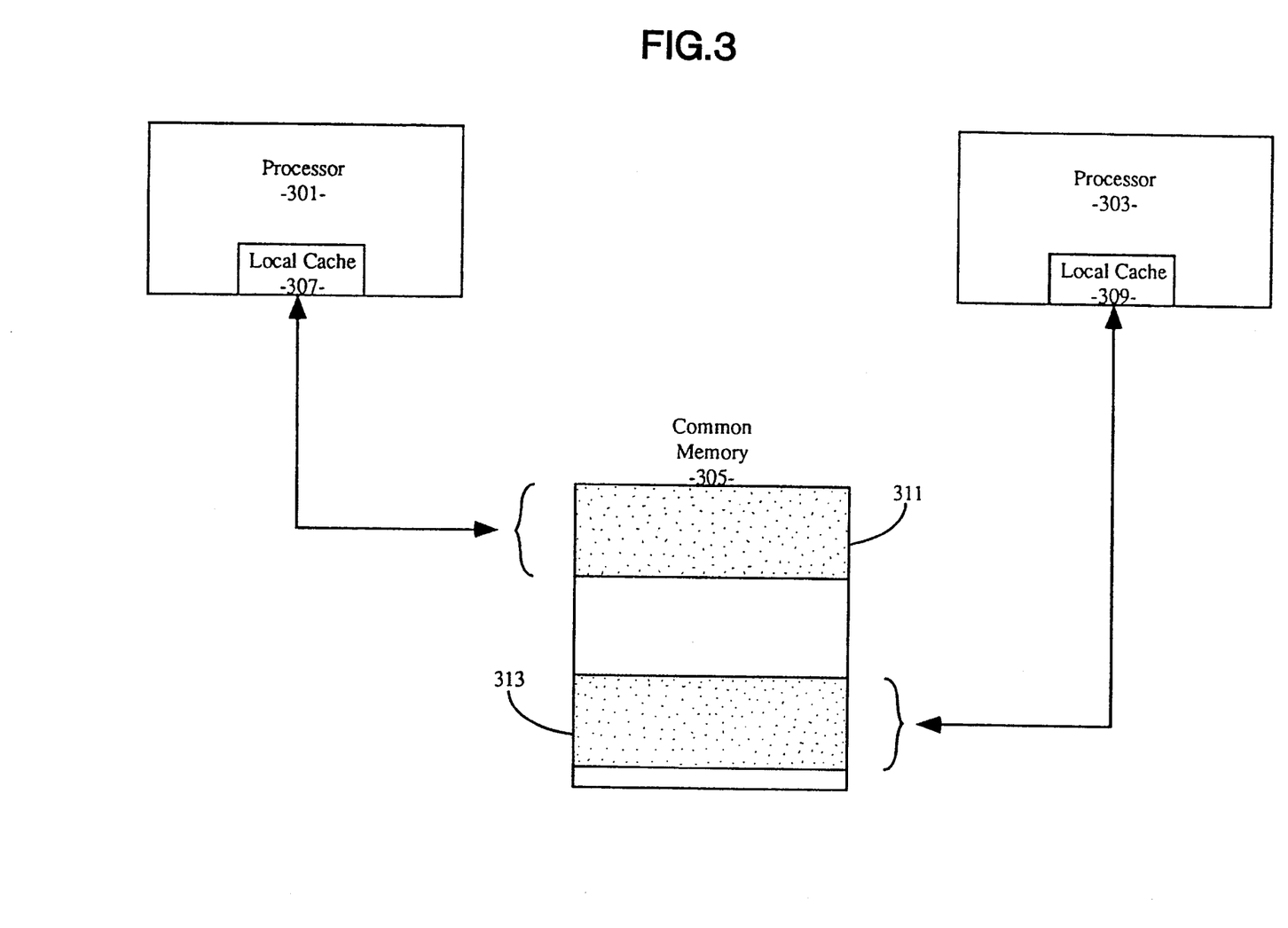
FIG. 3 is a block diagram illustrating accesses to independent portions of a common memory by two processors of a multi-processor system.

Referring now to FIG. 3, an example of a typical multi-processor application is illustrated. In the example illustrated in FIG. 3, processor 301 includes local cache 307 which provides high speed local storage for processor 301. Similarly, processor 303 includes local cache 309 for high speed local storage. Both processor 301 and processor 303 use common memory 305 as a source for processor instructions and a source/destination for processed information. As described earlier, a portion of the contents of common memory 305 is transferred into local cache 307 and/or local cache 309 for high speed local storage and subsequent processing by processors 301 and 303, respectively.

In the example of FIG. 3, processor 301 and its local cache 307 only use a portion 311 of common memory 305. Similarly, processor 303 and its local cache 309 only uses a different portion 313 of common memory 305. In general, local cache 307 and local cache 309 may receive any portion of common memory 305. In the example of FIG. 3, however, local cache 307 and local cache 309 are restricted to non-overlapping portions (i.e. portion 311 and portion 313) of common memory 305. In this configuration, processor 301 will never read or write information from/to common memory portion 313. Similarly, processor 303 will never read or write information from/to common memory portion 311. Thus, no manipulation by processor 301 or access by local cache 307 will render local cache 309 inconsistent. Similarly, no manipulation of data by processor 303 or access by local cache 309 will render local cache 307 inconsistent. Therefore, the snooping operation does not need to be performed for a reference to either local cache 307 or local cache 309 as long as memory portions 311 and 313 do not overlap. Unfortunately, prior art systems do not provide a means for suppressing the snooping operation for a multi-processor system configured as shown in FIG. 3. Thus, system performance is degraded by the unnecessary performance of the snooping operation.

The present invention provides a means for associating each memory reference with a set of specific processors that may cache that memory reference. Thus, a means is provided for determining when snooping is needed and which local caches need to be snooped. The present invention, therefore, optimizes the snooping operation and thus significantly improves the performance of a multi-processor system.

The present invention uses address bits of a memory reference for the purpose of encoding cache information associated with the memory reference. The combination of the memory reference address and the cache information results in a memory access request that may be used to optimize the snooping operation.

Figure 4:
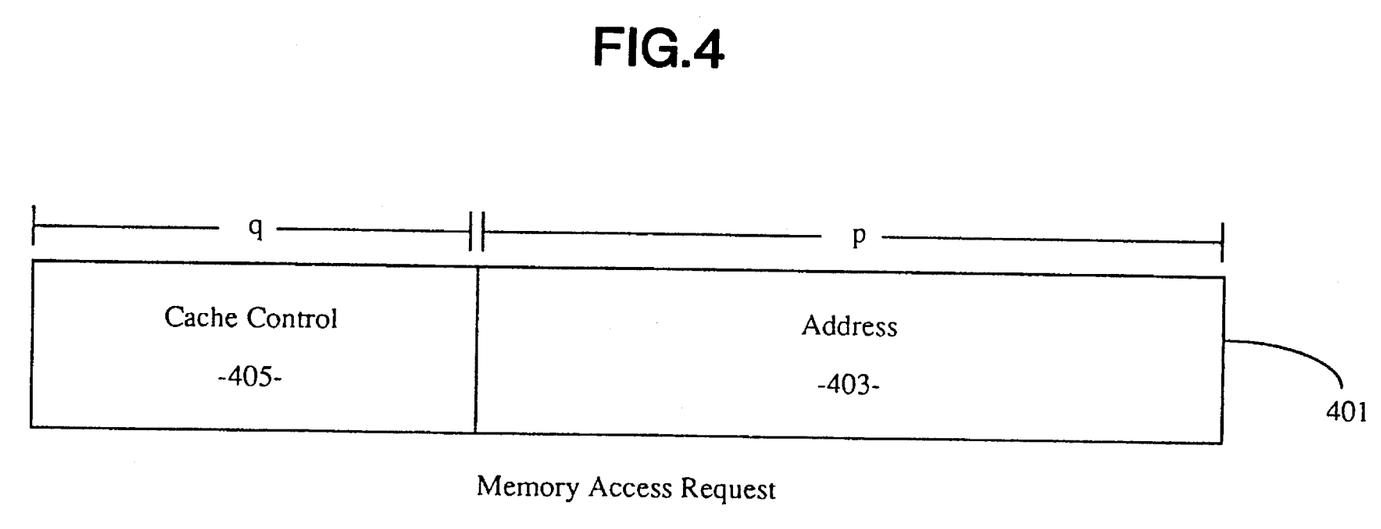
FIG. 4 illustrates the structure of a memory access request used in the present invention.

Referring now to FIG. 4, the structure of a memory access request of the present invention is illustrated. Each memory access request is comprised of at least two elements. First, an address field 403 is provided to define the location of the desired data item. The address field 403 may be p bits in length. In the preferred embodiment, the address field 403 of a memory access request is 26 bits wide.

The present invention includes cache control information within each memory access request. This cache control information is stored in a cache control field 405 as shown in FIG. 4. Cache control field 405 comprises a plurality of bits that define a relationship between address field 403 and a plurality of local caches associated with processors in a multi-processor system. This relationship determines which of a plurality of local caches may cache the data item referenced by the address within address field 403. The present invention uses q bits to encode cache control information. In the preferred embodiment, two bits are used to encode cache control information.

Figure 5:
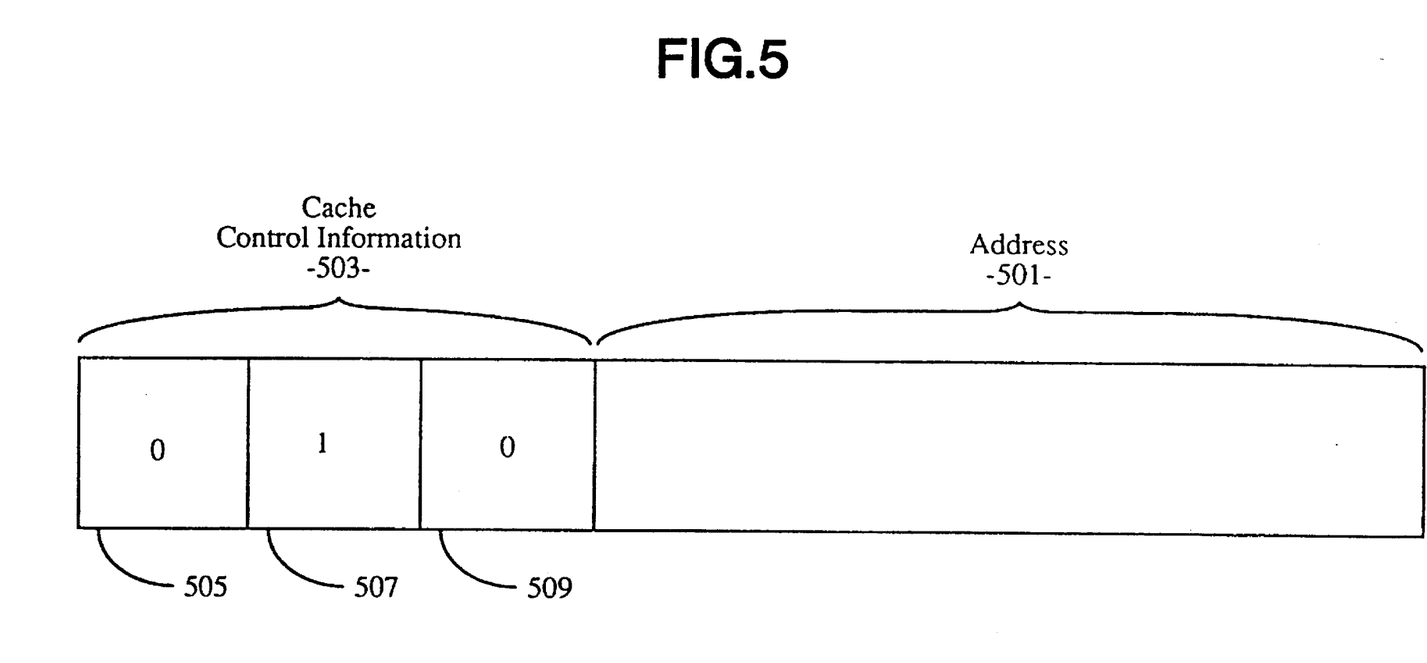
FIG. 5 illustrates an example of a memory access request having a plurality of cache control bits.

Referring now to FIG. 5, an example of the operation of the present invention is illustrated. In the example of FIG. 5, three cache control bits 505, 507, and 509 are used to encode cache control information 503. Bits 505, 507, and 509 of cache control information 503 are each associated with a processor in a multi-processor system. Address field 501 comprises a plurality of address bits used to fully address a common memory which is coupled to the multi-processor system. Cache control information 503 and address field 501 comprise a memory access request for accessing data items located in common memory.

In the example of FIG. 5, three cache control bits (505, 507, and 509) are provided to establish a cache control relationship with three processors in a multi-processor system. Cache control bit 505 corresponds to a first processor (not shown) or processor 1. Cache control 507 corresponds to a second processor (not shown) or processor 2 and cache control bit 509 corresponds to a third processor (not shown) or processor 3. If a bit of cache control field 503 is set to a value of 1, the local cache associated with the processor corresponding to that cache control bit may cache the data item referenced by the address in address field 501. If, however, a cache control bit of cache control field 503 is set to a zero value, the local cache associated with the processor corresponding to that cache control bit may not cache the data item referenced by the address in the address field 501. Thus, cache control information 503 defines which processors in a multi-processor system may cache the data item referenced by address field 501.

In the example of FIG. 5, one cache control bit is provided per processor in a multi-processor system. Thus, n bits are required to encode cache control information for a multi-processor system having n processors. It will be apparent to those skilled in the art that techniques other than a one cache control bit per processor technique may be used for encoding cache control information in a memory access request. For example, if fewer combinations of cacheability are supported (i.e. not all processors are allowed complete freedom to cache any portion of memory), fewer cache control bits are required. In general, it is desirable to minimize the number of address bits used for cache control. By restricting the caching allowed between processors and memory, an acceptable number of address bits may be allocated for caching. If additional address bits are available, two or more bits in cache control field 503 may be associated with each processor in order to encode additional cache control information.

Referring again to the example of FIG. 5, cache control bit 507 is set to a value of 1 while cache control bits 505 and 509 are set to a value of 0. In this example, therefore, processors 1 and 3 (not shown) may not cache the data item referenced by address field 501 within their respective local caches. Conversely, processor 2 may cache the data item referenced by address field 501 within its local cache, because cache control bit 507 is set to a value of 1. Thus, for each memory access request, the cache control information 503 defines which processors in a multi-processor system may cache the referenced data item. The complexity of cache control information maintained for each memory reference is limited only by the number of bits available on the address bus for a particular computer system.

Figure 6:
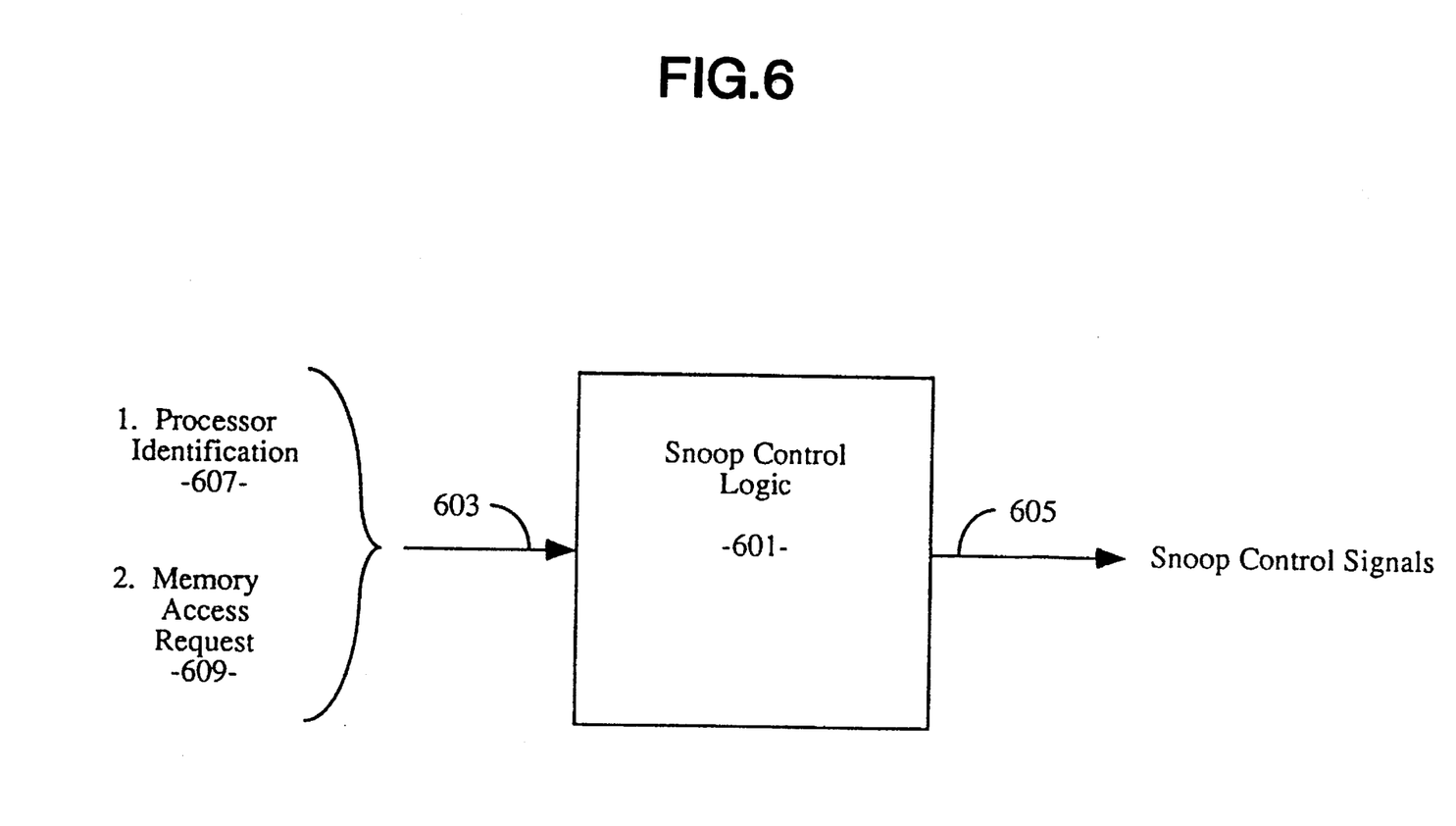
FIG. 6 illustrates the interface for the snoop control logic of the present invention.

Having described the cache control information provided within each memory access request in the present invention, the cache control information may be used to optimize the snooping operation performed to maintain cache consistency between local caches in a multi-processor system. Referring now to FIG. 6, an illustration of the interface to the snoop control logic 601 of the present invention is illustrated. Snoop control logic 601 receives as input on line 603 a processor identification 607 and a memory access request 609. Snoop control logic 601 receives these inputs for each cacheable memory reference. The processor identification 607 identifies the referencing processor making or originating the memory reference. The memory access request 609 identifies the memory location referenced by the referencing processor and provides the cache control information associated with that memory reference. The format of the memory access request 609 received by snoop control logic 601 is the same as that illustrated in FIG. 4 and described above.

For each memory reference, snoop control 601 uses the input processor identification 607 and the cache control information of the input memory access request 609 to determine whether and how to perform the snooping operation.

In the preferred embodiment, the memory access request 609 includes a plurality of cache control bits wherein one bit is assigned to each processor in a multi-processor system. On each memory reference, snoop control logic 601 reads the cache control information from memory access request 609. If any bit of the cache control field within the input memory access request 609 other than the bit corresponding to the processor identified by processor identification 607 is set to a value of 1, snoop control logic 601 enables snoop control signals 605 to perform a snooping operation for the memory reference. The snooping operation is enabled in this way if the referenced data item may be cached in a processor other than the referencing processor (i.e. the processor identified by processor identification 607). If, however, the cache control bits of input memory access request 609 do not indicate that the referenced data item is cached in a processor other than the referencing processor, the snooping operation is not performed (or suppressed) by snoop control logic 601. Therefore, the processor overhead inherent in the snooping operation is avoided for those memory references for which a data item is not cached in a processor other than the referencing processor. Thus, the cache control information portion of each memory access request may be used to optimize the snooping operation and thereby improve the performance of a multi-processor system.

The content of the cache control field for each memory access request is loaded by an operating system. An operating system is processing logic used to control the operation and processing in a multi-processor system. The operating system is used to encode the cache control information into the address bits of each memory access request. On initialization of the operating system, a table of caching information is built and maintained in memory. The caching table is used to define relationships between blocks of memory and the processors that will use those blocks of memory. Caching information may be maintained on a memory page basis for computer systems using a paging architecture. The table of caching information may be updated and revised by the operating system depending upon which tasks are running and which pages of memory need to be referenced by those running tasks. If a particular task needs to reference a page of memory but does not need to cache that page, the operating system clears a bit in the cache control field for that page which may serve to suppress the snooping operation. The operating system may also disable the local cache for that page. If, however, a task needs to reference a page of memory and needs to cache that page, the operating system sets a bit in the cache control field for that page to a value of 1 to indicate that caching is enabled for that page.

Thus, a multi-processor cache control system is disclosed wherein cache control information is encoded into the address bits of a memory access request. The encoded cache control information is used to optimize cache control functions such as snooping.

Although the present invention has been described herein with reference to a specific embodiment, many modifications and variations therein will readily occur to those skilled in the art. Accordingly, all such variations and modifications are included within the intended scope of the present invention as defined by the following claims:

What is claimed is:

1. In a multi-processor computer system having a memory, a plurality of processors, a plurality of caches, and cache consistency logic, a cache control system comprising:

means for establishing which processors of the plurality of processors are allowed to cache a specific portion of the memory;

means for receiving a memory access request, said memory access request having addressing information and cache control information, said addressing information identifying a data item in said memory, said cache control information associating said data item with processors of said plurality of processors that are allowed to cache said data item;

means for determining which processors of said plurality of processors are allowed to cache said data item based upon said cache control information; and means for activating said cache consistency logic only if at least one processor other than said processor originating said memory access request are allowed to cache said data item, said at least one other processor is allowed to cache said data item being denoted at least one first processor, wherein said cache consistency logic includes means for determining which of said at least one first processors cache a data item identified by said addressing information.

2. The cache control system as claimed in claim 1 further including means for receiving a processor identification that identifies a processor of said plurality of processors that originated said memory access request.

3. The cache control system as claimed in claim 1 wherein said addressing information and said cache control information is encoded within the same address value.

4. The cache control system as claimed in claim 1 wherein said addressing information and said cache control information is received by said means for receiving on an address bus.

5. The cache control system as claimed in claim 1 further including means for suppressing the operation of said cache consistency logic if no processor other than said processor originating said memory access request is allowed to cache said data item.

6. The cache control system as claimed in claim 1 wherein said cache control information is programmably configured on initialization of said multi-processor computer system.

7. The cache control system as claimed in claim 1 wherein said means for receiving a memory access request receives a first memory access request and subsequently a second memory access request, cache control information in said first memory access request being different from cache control information in said second memory access request.

8. In a multi-processor computer system having a memory, a plurality of processors, a plurality of caches, and cache consistency logic, a process for maintaining the consistency of said plurality of caches, said process comprising the steps of:

establishing which processors of the plurality of processors are allowed to cache a specific portion of the memory;

receiving a memory access request, said memory access request having addressing information and cache control information, said addressing information identifying a data item in said memory, said cache control information associating said data item with processors of said plurality of processors that are allowed to cache said data item;

determining which processors of said plurality of processors are allowed to cache said data item based upon said cache control information; and activating said cache consistency logic only if at least one processor other than said processor originating said memory access request is allowed to cache said data item, said at least one other processor is allowed to cache said data item being denoted at least one first processor, wherein said activating step comprises the step of determining which of said at least one first processors cache a data item identified by said addressing information.

9. The process as claimed in claim 8 further including a step of receiving a processor identification that identifies a processor of said plurality of processors that originated said memory access request.

10. The process as claimed in claim 8 wherein said addressing information and said cache control information is encoded within the same address value.

11. The process as claimed in claim 8 wherein said addressing information and said cache control information is received in said receiving step on an address bus.

12. The process as claimed in claim 8 further including a step of suppressing the operation of said cache consistency logic if no processor other than said processor originating said memory access request is allowed to cache said data item.

13. The process as claimed in claim 8 wherein said cache control information is programmably configured on initialization of said multi-processor computer system.

14. The process as claimed in claim 8 wherein said step of receiving a memory access request further includes the steps of:

receiving a first memory access request; and receiving a second memory access request, cache control information in said first memory access request being different from cache control information in said second memory access request.

* * * * *